United States Patent
Pietilä et al.

(10) Patent No.: US 7,702,003 B2
(45) Date of Patent: *Apr. 20, 2010

(54) MULTI-PATH DETECTION METHOD FOR CDMA RECEIVERS

(75) Inventors: Samuli Pietilä, Tampere (FI); Harri Valio, Kämmenniemi (FI)

(73) Assignee: Nokia Corporation, Espoo (FI)

(*) Notice: Subject to any disclaimer, the term of this patent is extended or adjusted under 35 U.S.C. 154(b) by 4 days.

This patent is subject to a terminal disclaimer.

(21) Appl. No.: 12/288,645

(22) Filed: Oct. 21, 2008

(65) Prior Publication Data

US 2009/0147833 A1    Jun. 11, 2009

(51) Int. Cl.
*H04B 1/707* (2006.01)
(52) U.S. Cl. .................................................. 375/150
(58) Field of Classification Search ............... 375/142, 375/144, 147, 150
See application file for complete search history.

(56) References Cited

U.S. PATENT DOCUMENTS

| | | | |
|---|---|---|---|
| 5,347,536 | A | 9/1994 | Meehan |
| 5,414,729 | A | 5/1995 | Fenton |
| 5,600,670 | A | 2/1997 | Turney |
| 5,914,943 | A | 6/1999 | Higuchi et al. |
| 6,463,091 | B1 | 10/2002 | Zhodzicshsky et al. |
| 6,658,048 | B1 | 12/2003 | Valio |
| 6,795,487 | B1 | 9/2004 | Bickerstaff et al. |
| 2001/0002203 | A1 | 5/2001 | Cahn et al. |
| 2002/0101912 | A1* | 8/2002 | Phelts et al. ............ 375/148 |

FOREIGN PATENT DOCUMENTS

EP    1 143 652 A2    10/2001

OTHER PUBLICATIONS

"Theory and Performance of narrow Correlator Spacing in a GPS Receiver", Navigation, by A.J. van Dierendonck, P. Fenton and T. Ford, vol. 39, No. 3, Fall 1992, pp. 265-283.
"Strobe & Edge Correlator Multi-path Mitigation for Code", ION GPS-96, by L. Garin, F. van Diggelen and J.S. Rousseau, Sep. 17-20, 1996, Kansas City, Missouri, pp. 657-664.
"The Multi-path Estimating Delay Lock Loop", by R.D.J. van Nee, ISSSTA-02, Nov. 29-Dec. 2, 1992, Yokohama, Japan, pp. 39-42.

\* cited by examiner

*Primary Examiner*—Kevin Y Kim

(57) ABSTRACT

The present invention provides a method for a multi-path detection analysis and selectivity of CDMA signals using spread spectrum receivers using a correlation technique. The invention is based on determining by the spread spectrum receiver whether a distortion of a received radio frequency signal, caused by a multi-path component of said received signal, meets a predetermined condition using a pre-selected correlation analysis of said received signal. This invention is generally applicable to global navigation satellite system (GNSS) receivers and it is particularly useful in GNSS receivers, such as GPS (global positioning system) and Galileo receivers. The important goal of this invention is to provide a simple method for identifying signals that are corrupted by multi-path effects, and can be excluded from position calculation in the GNSS receivers.

13 Claims, 7 Drawing Sheets

MULTI-PATH DETECTION METHOD FOR CDMA RECEIVERS

PRIORITY AND CROSS-REFERENCE TO RELATED APPLICATION

This application claims priority from U.S. patent application Ser. No. 11/026,503, filed Dec. 29, 2004.

TECHNICAL FIELD

This invention generally relates to spread spectrum receiver, and more specifically to a multi-path detection analysis and selectivity of code modulated signals using spread spectrum receivers.

BACKGROUND ART

GNSS (global navigation satellite system) receivers determine their position by making accurate range measurements to transmitting satellites. However, the accuracy may be severely decreased if the signals are distorted by multi-path effects. Typically a multi-path environment is especially bad in urban areas where there are many reflecting surfaces as shown in FIG. 1. Unfortunately, many mobile phone users live in the urban areas as well.

Traditionally GNSS receivers try to minimize the harmful effect of multi-path by making the range measurements less sensitive to multi-path. Several such methods are known, e.g., a narrow correlator described by A. J. van Dierendonck, P Fenton and T. Ford in "Theory and Performance of Narrow Correlator Spacing in a GPS Receiver", Navigation, Vol. 39, No. 3, Fall 1992, pp. 265-283, a strobe correlator described by L. Garin, F. van Diggelen and J-M. Rousseau, in "Strobe & Edge Correlator Multi-path Mitigation for Code", ION GPS-96, Sep. 17-20, 1996, Kansas City, Mo., pp. 657-664, and a multi-path estimating delay lock loop described by R. D. J. van Nee, in "The Multi-path Estimating Delay Lock Loop", ISSSTA-92, Nov. 29-Dec. 2, 1992, Yokohama, Japan, pp. 39-42.

Typically a GPS (global positioning system) receiver sees 8-12 satellites simultaneously. In the future, when a European Galileo system is operational, the number of visible satellites will be doubled to 16-24 for a combined GPS-Galileo receiver. However, only four satellites are needed for a position calculation. Hence it would be advantageous to select for position calculation the signals that are the least corrupted by a multi-path propagation.

DISCLOSURE OF THE INVENTION

This invention is a novel method for multi-path detection analysis and selectivity of code modulated signals using spread spectrum receivers.

According to a first aspect of the invention, a method for a multi-path detection analysis of a radio frequency signal by a spread spectrum receiver, comprises: receiving a radio frequency signal containing a multi-path component by the spread spectrum receiver and converting the radio frequency signal to a digital signal; and detecting the multi-path component and determining by the spread spectrum receiver whether a distortion of the radio frequency signal caused by the multi-path component meets a predetermined condition using a pre-selected correlation analysis of the digital signal, thus implementing the multi-path detection analysis of the radio frequency signal by the spread spectrum receiver.

According further to the first aspect of the invention, the step of determining may be performed by a receiver processing block. Further, the radio frequency signal may be used by the spread spectrum receiver for further processing beyond the receiver processing block, only if the distortion meets the predetermined condition, thus implementing a selective function of the multi-path detection operation of the spread spectrum receiver.

Further according to the first aspect of the invention, the digital signal may be generated by converting the radio frequency signal to a radio frequency electrical signal by an antenna of the spread spectrum receiver with subsequent converting the radio frequency electrical signal to a digital signal by a preprocessor of the spread spectrum receiver.

Still further according to the first aspect of the invention, the radio frequency signal may be a code division multiple access (CDMA) signal.

According further to the first aspect of the invention, prior to the determining, the pre-selected correlation analysis of the digital signal may be performed by a receiving channel block of the spread spectrum receiver, and the analysis comprises the steps of: generating a data intermediate signal by removing a residual carrier frequency from the digital signal using a phase-loop feedback and providing the data intermediate signal to each of K correlators of the receiving channel block, wherein K is an odd integer of at least a value of three; providing a code signal indicative of a delay-loop feedback to a first delay module of the receiver processing block; providing each of K consecutively delayed code signals to one corresponding correlator module of K correlator modules, wherein the each of the K delayed code signals is consecutively and individually delayed by pre-selected values relative to a previously delayed code signal of the K consecutively delayed code signals starting with the code signal provided by the receiver processing block; and generating each of K correlation signals by a corresponding one of the K correlator modules using the data intermediate signal and the K delayed code signals and providing the K correlation signals to the receiver processing block for the determining, wherein the each of the K correlation signals contains an amplitude parameter or a phase parameter or both said amplitude parameter and said phase parameter. Further, K may be an odd integer of at least a value of five and said distortion of said radio frequency signal caused by said multi-path component may be evaluated in said receiver processing block using said predetermined condition by comparing said amplitude parameter of an Mth correlation signal of said K correlation signals generated using an Mth delayed code signal of the K consecutively delayed code signals, wherein M=1, or 2 ... or (K−1)/2, and the amplitude parameter of a corresponding Lth correlation signal of the K consecutively delayed code signals generated using a corresponding Lth delayed code signal of the K correlation signals, wherein L=K, or K−1 ... or (K+3)/2. Still further, the amplitude parameter of two correlation signals of the K correlation signals, generated by corresponding correlation modules using corresponding delayed code signals of the K consecutively delayed code signals delayed by (K−1)/2 and (K+3)/2 times respectively, may be maintained equal using a delay-locked loop of the spread spectrum receiver. Further still, the distortion of the radio frequency signal caused by the multi-path component may be evaluated in the receiver processing block by comparing amplitude parameter of a first of the K correlation signals, generated using a first delayed code signal of the K consecutively delayed code signals and a last of the K correlation signals generated using a last delayed code signal of the K consecutively delayed code signals. Yet still further, K may be equal to 5.

According still further to the first aspect of the invention, the phase parameter of one correlation signal of the K correlation signals, generated by a corresponding correlation module using a corresponding delayed code signal of the K consecutively delayed code signals delayed by (K+1)/2 times, may be maintained to be zero using a phase-locked loop of the spread spectrum receiver, and phase parameters of the K correlation signals may be provided to the receiver processing block for the determining. Further, the code signal may be generated by a code generating block of the receiving channel block in response to a code control signal indicative of the delay-loop feedback from the receiver processing block as a part of a delay-locked loop. Still further, the data intermediate signal may be generated by a residual carrier removing block of the receiving channel block in response to a frequency control signal indicative of the phase-loop feedback from the receiver processing block. According to a second aspect of the invention, a computer program product comprises: a computer readable storage structure embodying computer program code thereon for execution by a computer processor with the computer program code, characterized in that it includes instructions for performing the steps of the first aspect of the invention indicated as being performed by any component of the spread spectrum receiver, or a terminal containing said spread spectrum receiver.

According to a third aspect of the invention, a spread spectrum receiver capable of a multi-path detection operation, comprises: an antenna, responsive to a radio frequency signal containing a multi-path component, for providing a radio frequency electrical signal; a preprocessor, responsive to the radio frequency electrical signal, for providing a digital signal; and a receiving module, for performing a pre-selected correlation analysis of the digital signal; and a receiver processing block, for detecting the multi-path component and determining whether a distortion of the radio frequency signal caused by the multi-path component meets a predetermined condition using a pre-selected correlation analysis of the digital signal.

According further to the third aspect of the invention, the radio frequency signal may be used by the spread spectrum receiver for further processing beyond the receiver processing block, only if the distortion meets the predetermined condition, thus implementing a selective function of the multi-path detection operation of the spread spectrum receiver.

Further according to the third aspect of the invention, the radio frequency signal may be a code division multiple access (CDMA) signal.

Still further, according to the third aspect of the invention, each of the N receiving channel blocks, may comprise: means for generating a data intermediate signal by removing a residual carrier frequency from the digital signal using a phase-loop feedback; means for generating a code signal indicative of a delay-loop feedback; K correlator modules, wherein K is an odd integer of at least a value of three, for generating each of K correlation signals by a corresponding one of the K correlator modules using the data intermediate signal and K delayed code signals and for providing the K correlation signals to the receiver processing block for the determining whether a distortion of the radio frequency signal caused by the multi-path component meets a predetermined condition using a pre-selected correlation analysis of the digital signal, wherein the each of the K correlation signals contains an amplitude parameter or a phase parameter or both the amplitude parameter and the phase parameter; and K delay modules, for providing each of K consecutively delayed code signals to one corresponding correlator module of the K correlator modules, wherein the each of the K delayed code signals is consecutively and individually delayed by pre-selected values relative to a previously delayed code signal of the K consecutively delayed code signals starting with the code signal provided to a first delay module out of the K delay modules by the receiver processing block. Further, K may be an odd integer of at least a value of five and the distortion of the radio frequency signal caused by the multi-path component may be evaluated in the receiver processing block using the predetermined condition by comparing the amplitude parameter of an Mth correlation signal of the K correlation signals generated using an Mth delayed code signal of the K consecutively delayed code signals, wherein M=1, or 2 . . . or (K−1)/2, and the amplitude parameter of a corresponding Lth correlation signal of the K consecutively delayed code signals generated using a corresponding Lth delayed code signal of the K correlation signals, wherein L=K, or K−1 . . . or (K+3)/2. Still further, wherein the amplitude parameter of two correlation signals of the K correlation signals, generated by corresponding correlation modules using corresponding delayed code signals of the K consecutively delayed code signals delayed by (K−1)/2 and (K+3)/2 times respectively, may be maintained equal using a delay-locked loop of the spread spectrum receiver. Yet further still, wherein the distortion of the radio frequency signal caused by the multi-path component may be evaluated in the receiver processing block by comparing amplitude parameter of a first of the K correlation signals, generated using a first delayed code signal of the K consecutively delayed code signals and a last of the K correlation signals generated using a last delayed code signal of the K consecutively delayed code signals. Further still, K may be equal to 5

According further to the third aspect of the invention, wherein the phase parameter of one correlation signal of the K correlation signals, generated by a corresponding correlation module using a corresponding delayed code signal of the K consecutively delayed code signals delayed by (K+1)/2 times, may be maintained to be zero using a phase-locked loop of the spread spectrum receiver, and phase parameters of the K correlation signals may be provided to the receiver processing block for the determining. Still further, the code signal may be generated by a code generating block of the receiving channel block in response to a code control signal indicative of the delay-loop feedback from the receiver processing block as a part of a delay-locked loop. Yet still further, the data intermediate signal may be generated by a residual carrier removing block of the receiving channel block in response to a frequency control signal indicative of the phase-loop feedback from the receiver processing block.

According still further to the third aspect of the invention, the spread spectrum receiver may be a global navigation satellite system receiver, a global positioning system receiver or a Galileo receiver.

According to a fourth aspect of the invention, a system capable of a multi-path selective detection operation, comprises: a satellite, for providing a radio frequency signal; a base station, for providing a further radio frequency signal used for mobile communications; and a terminal, responsive to the radio frequency signal or to the further radio frequency signal, both containing a multi-path component, wherein the terminal contains a spread spectrum receiver capable of determining whether a distortion of the radio frequency signal caused by the multi-path component meets a predetermined condition using a pre-selected correlation analysis of the digital signal, thus implementing the multi-path detection operation.

According to a fifth aspect of the invention, a receiving module contained in a spread spectrum receiver for a multi-path detection analysis of a radio frequency signal, comprises: at least one receiving channel block, for performing a pre-selected correlation analysis for determining by a receiver processing block of the spread spectrum receiver whether a distortion of the radio frequency signal caused by the multi-path component meets a predetermined condition using a pre-selected correlation analysis of the digital signal, thus implementing the multi-path detection analysis of the radio frequency signal by the spread spectrum receiver, wherein the receiving module is removable from the spread spectrum receiver.

The present invention is a method to identify signals which are corrupted by multi-path effects. Such corrupted signals can be given smaller weight or excluded completely from position calculations, thus improving the positioning accuracy.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a method for a multi-path detection analysis and selectivity of code modulated signals using spread spectrum receivers using a correlation technique. The invention is based on determining by the spread spectrum receiver whether a distortion of a received radio frequency signal, caused by a multi-path component of said received signal, meets a predetermined condition using a pre-selected correlation analysis of said received signal, thus implementing the multi-path detection analysis and selectivity of the code modulated (e.g., CDMA) signals. This invention is generally applicable to spread spectrum receivers and it is particularly useful in the GNSS receivers, such as GPS (global positioning system) and Galileo receivers. Also, the invention can be applied in a broader sense to any communication system utilizing spread spectrum receivers. It can be applied to mobile phones, e.g., utilizing code-division multiple access (CDMA) or wideband CDMA (WCDMA), where it can be used, for example, for network positioning, where the mobile phone measures ranges to base stations.

The important goal of this invention is to provide a simple method for identifying signals that are corrupted by multi-path effects, and should thus be given a smaller weight or excluded from position calculations in the GNSS receivers.

Figure 1:
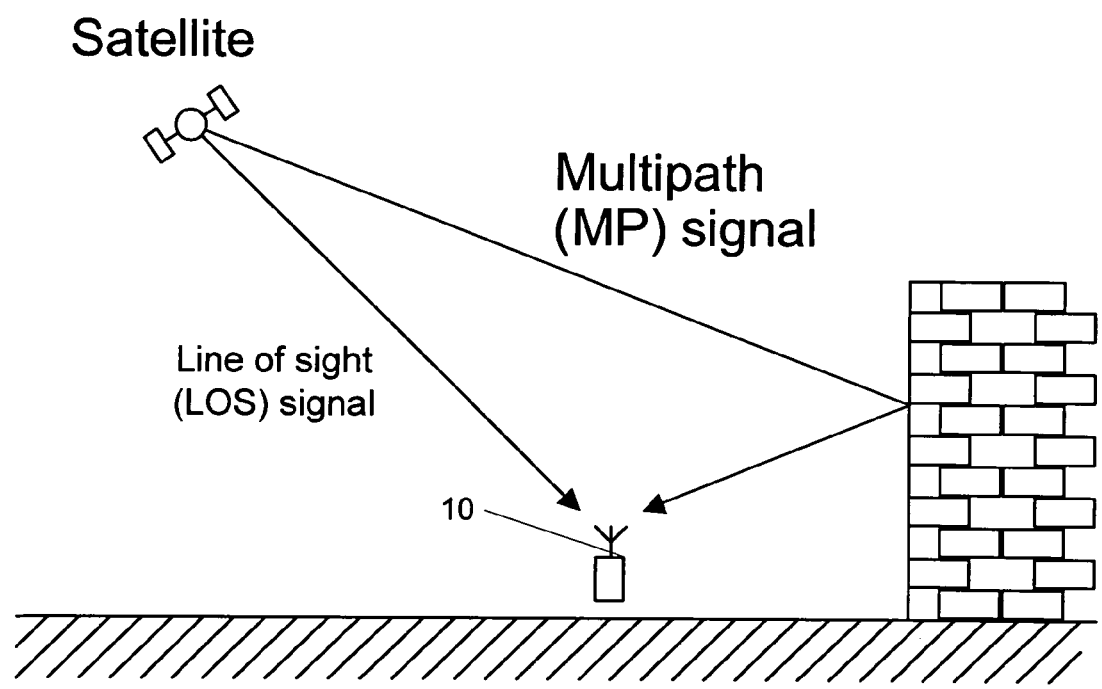
FIG. 1 is a diagram of multi-path scenario.
Figure 2:
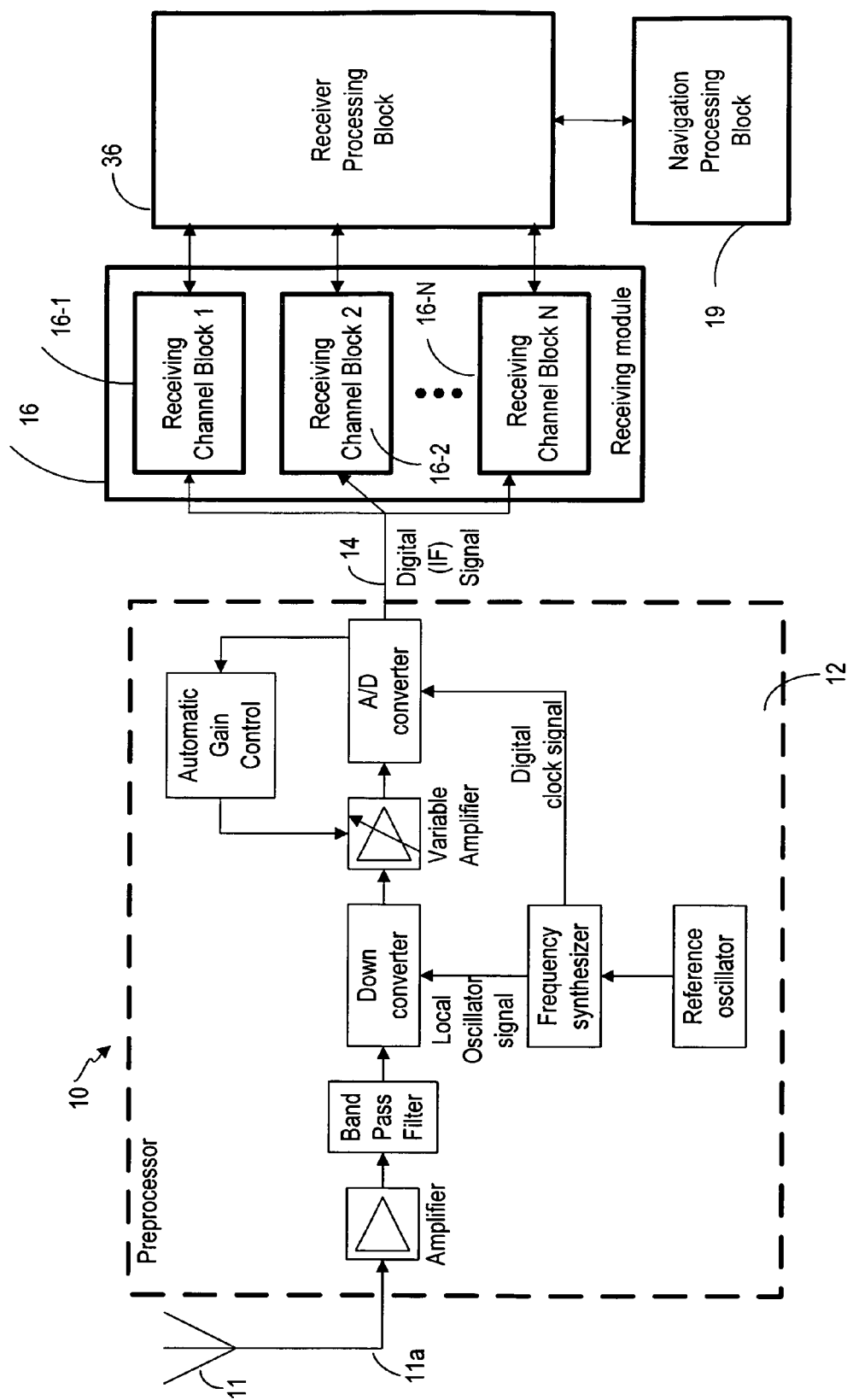
FIG. 2 is a block diagram representing an example of a global navigation satellite system receiver (spread spectrum receiver)

FIG. 2 is a block diagram representing one example, among others, of a typical operation of a global navigation satellite system receiver (or a spread spectrum receiver) 10 wherein the present invention can be applied. The receiver 10 can be a GPS (global positioning system) receiver, a Galileo receiver, or any other compatible receiver presently available or a subject of future technological advances, according to the present invention.

A typical receiver operation includes receiving the radio frequency signal and converting said radio frequency signal containing a multi-path component to a radio frequency electrical signal 11a by an antenna 11 followed by converting said radio frequency electrical signal 11a to a digital intermediate frequency (IF) signal (or a digital signal) 14 by a preprocessor 12 and providing said digital signal 14 to each of N receiving channel blocks 16-1, 16-2, . . . , 16-N (N is an integer of at least a value of one) of a receiving module 16 which normally exchanges information with the receiver processing block 36 during its operation and the receiver processing block 36 further communicates with a navigation processing block 19. The key innovation here involves a novel implementation and design of receiving channel blocks 16-1, 16-2, . . . , 16-N using a novel multi-path detection technique and special processing of the correlation information generated by any block of said receiving channel blocks 16-1, 16-2, . . . , 16-N according to multi-path processing algorithms described below in regard to FIGS. 3a-3c, 4a, 4b, and 5, according to the present invention.

Traditional GNSS receivers use three correlators to track the code phase and the carrier phase of the received satellite signal. Usually these correlators are called early, prompt and late correlators. A code phase is tracked by a delay-locked loop, and a carrier phase is tracked by a phase-locked loop in the traditional GNSS receivers.

Figure 3A:
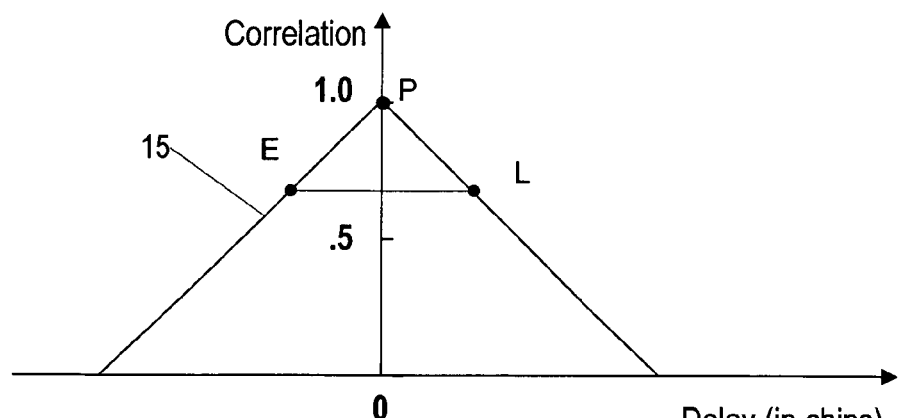
FIG. 3a is a diagram showing a correlation triangle for a line of sight signal.

FIG. 3a is a diagram showing one example among many others of a correlation triangle 15 (a correlation function as a function of a time delay in chips) for a line of sight (LOS) signal (an ideal case, no multi-path component). For the purpose of this invention the correlation function can be represented by an amplitude (or an amplitude parameter) and/or a phase (or phase parameter). The correlator output, generally, is a complex signal, it has real and imaginary part (often referred to as inphase and quadrature components, I and Q). The amplitude parameter is the amplitude of this complex value, and the phase parameter is its phase. FIGS. 3a-3c and 4a-4b discussed here present the amplitude of the correlator output. Points marked E, P and L correspond to signals generated by the early, prompt and late correlators, respectively. Points E and L are usually symmetrical in the time delay domain relative to the point P.

Figure 3B:
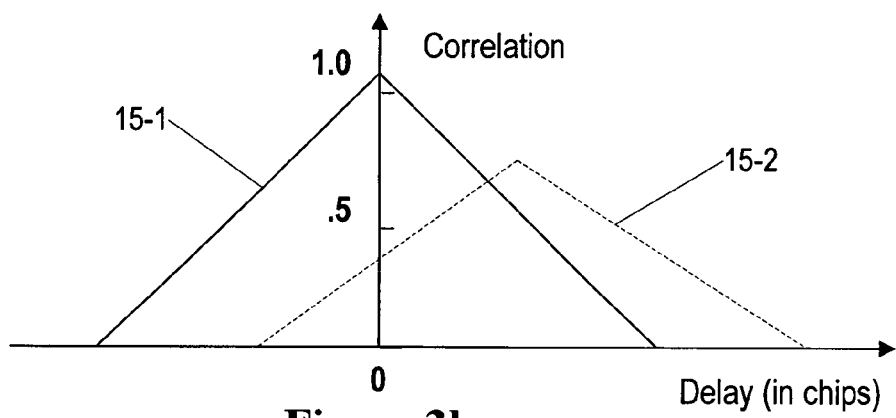
FIG. 3b is a diagram showing correlation triangles for a line of sight signal and for a multi-path signal.
Figure 3C:
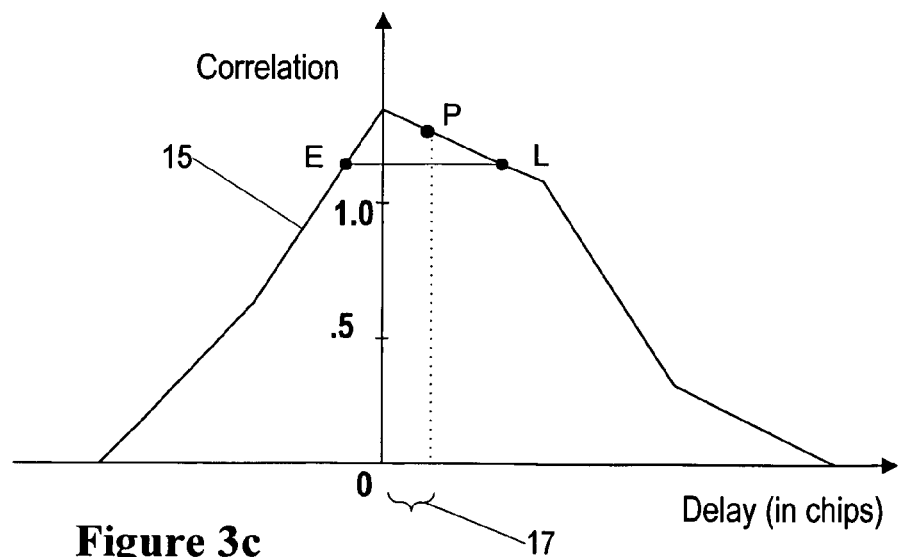
FIG. 3c is a diagram showing a correlation triangle for combined line of sight and multi-path signals.

In the delay-locked loop, the receiver calculates an error signal describing how far away the prompt correlator is from the peak of the correlation triangle, and tries to keep that error signal at zero. When the error signal is zero and there is no multi-path signal, the receiver is tracking the received code phase accurately. A typical error signal (or an early-minus-late error signal) is the correlation function (e.g., its amplitude parameter) at the E (early) point minus the correlation function at the L (late) point. When the error signal (early minus late) is zero, the correlation signals at the E and L points are equal (on the same level), as shown in FIG. 3a. However, when the signal is corrupted by the multi-path reflections, the tracking point is shifted from the peak of the LOS signal. FIGS. 3b and 3c demonstrate this situation.

FIG. 3b is an example, among others, of a diagram showing correlation triangle 15-1 for the line of sight signal and a correlation triangle 15-2 for a multi-path signal. FIG. 3c is a diagram showing a correlation triangle 15 for a combined correlation function for the line of sight and for the multi-path signals shown in FIG. 3b. As shown in FIG. 3c the tracking point P is shifted from the peak of the LOS signal by a time delay error 17.

Figure 4A:
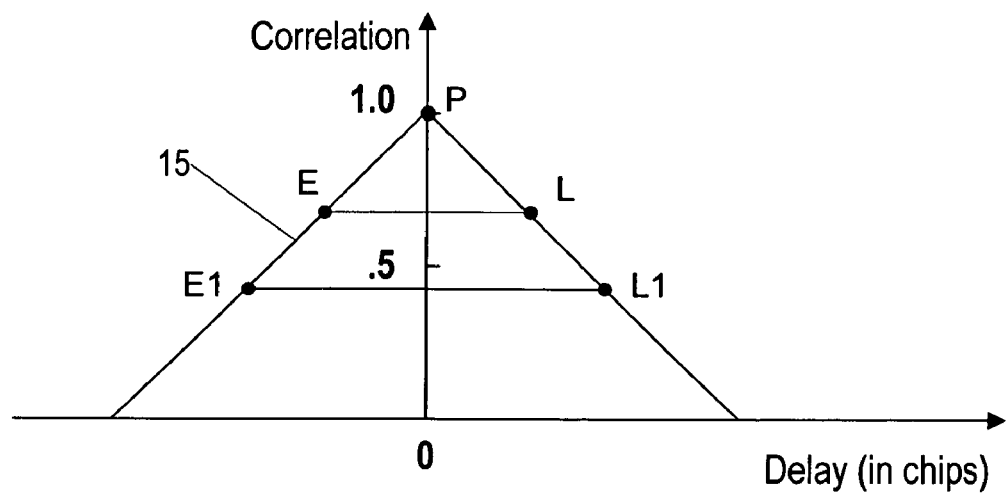
FIG. 4a is a diagram showing a correlation triangle for a line of sight signal (multi-path-free case) with additional correlation signals, according to the present invention.
Figure 4B:
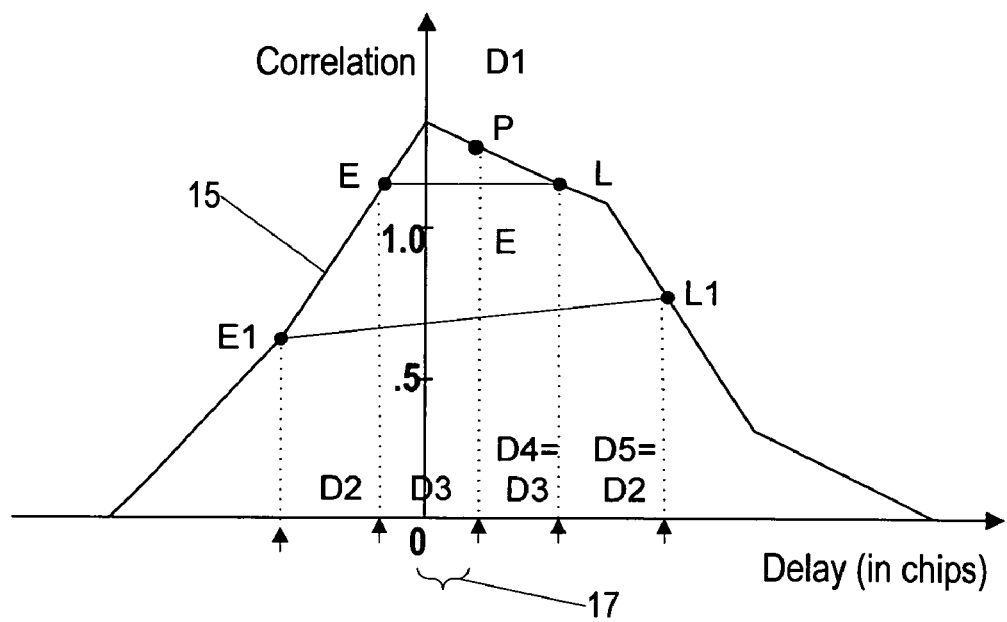
FIG. 4b is a diagram showing a correlation triangle for a multi-path case with additional correlation signals, according to the present invention.

By adding another early-late correlator pair (see points E1 and L1 in FIGS. 4a and 4b), also symmetrical in the time delay domain relative to the point P (time intervals D4=D2 as well as D5=D2 as shown in FIG. 4b) but with a different time spacing (a different time delay), it is possible to calculate an additional early-minus-late error signal using this additional early-late correlator pair. If there are no multi-path effects (a multi-path-free case), and the receiver is tracking the signal properly, both the original early-minus-late error and the additional early-minus-late error signals are zeros. FIG. 4a presents this situation showing the correlation triangle for the line of sight signal (the multi-path-free case) with additional correlation signals (for the additional early-late correlator pair), according to the present invention;

However, when the multi-path signal is present, the original early-minus-late signal starts to track the distorted composite signal. The original early-minus-late error signal is still zero, because the receiver drives it to zero, although it is not the correct tracking point anymore. However, the additional early and late correlator signals are not at the same level, and thus the additional early-minus-late error signal is not zero. This is due to the fact that the distorted correlation triangle is not symmetrical. FIG. 4b depicts this case showing the correlation triangle for a multi-path case with the additional correlation signals (at the E1 and L1 points), according to the present invention.

Also according to the present invention, it is possible to introduce more than one of additional (further) early-late correlator pairs, also symmetrical in the time delay relative to the point P but with different time spacing (different time delay), and therefore it is possible to calculate an additional early-minus-late error signal for those further early-late correlator pairs, if it is required by an application (e.g., a more accurate determination is required). This is consistent with the main goal of the present invention of determining by the spread spectrum receiver 10 whether the distortion of the received radio frequency signal caused by a multi-path component of said received signal meets said predetermined condition using said pre-selected correlation analysis of said received signal for implementing the multi-path detection analysis and selectivity of the code modulated signals.

Hence, it is possible to detect a multi-path situation by observing the output of two early-minus-late signals with different correlator time delay spacings. Once a good enough signal tracking is obtained (the early-minus-late error signal used to track the received signal is close enough to zero), the additional early-minus-late error signal should be also close to zero. Otherwise the correlation triangle is not symmetrical (e.g., said predetermined condition is not met), and the presence of a not acceptable multi-path component can be declared. According to the present invention, the consequence of said "declaration" can be deselecting said code modulated signal (e.g., from a particular satellite) from further consideration and processing or assigning a smaller weight to information contained in said "multi-path" contaminated CDMA signal than to a "clean" multi-path-free signal. The magnitude of the additional early-minus-late error signal (i.e., how much this additional early-minus-late error signal deviates from zero) gives an approximate estimate of the severity of a multi-path problem. Thus, according to the present invention, the magnitude of the additional early-minus-late error signal can be used to determine how much the weight of a signal from a particular satellite should be reduced in position calculations.

In the phase-locked loop, the receiver calculates the phase of the prompt correlator, and tries to keep the phase close to zero at the prompt point (P point). If there is data modulation present in the received signal, e.g., a Costas loop can be used, otherwise (no data modulation) a plain phase-locked loop is enough. The multi-path signal has a different Doppler frequency than the LOS signal, thus the correlation triangle will be distorted also in a phase domain, and the phase tracking will be also in error. That means, e.g., that the phase (or the phase parameter of the correlation signal) of correlators at E, L, E1 and L1 can be different from zero (for the correlator P) and from each other.

In the multi-path-free case, the phase of the prompt correlator signal and of all other correlator signals are the same, and the phase of the prompt correlator is driven to zero by the receiver. However, when multi-path distorts the correlation triangle, the phase of the prompt correlator output and other correlators is no longer the same. If the receiver is phase-locked, the phase of the prompt correlator signal remains zero, but the output signals of other correlators are no longer zeros due to the multi-path effects. Therefore, according to the present invention, the multi-path component can be detected by observing the phase difference between the output signals from different correlators. Even if the receiver is not yet fully locked (e.g., code- and/or phase-locked-loop does not need to be tracking perfectly), the phases of the output signals from the different correlators will be different disclosing the presence of the multi-path component and the phase method can be applied directly after the radio frequency signal acquisition without the need to wait for tracking to stabilize. It is also noted that for phase comparisons, the correlators do not have to be symmetrical about the prompt point.

Figure 5:
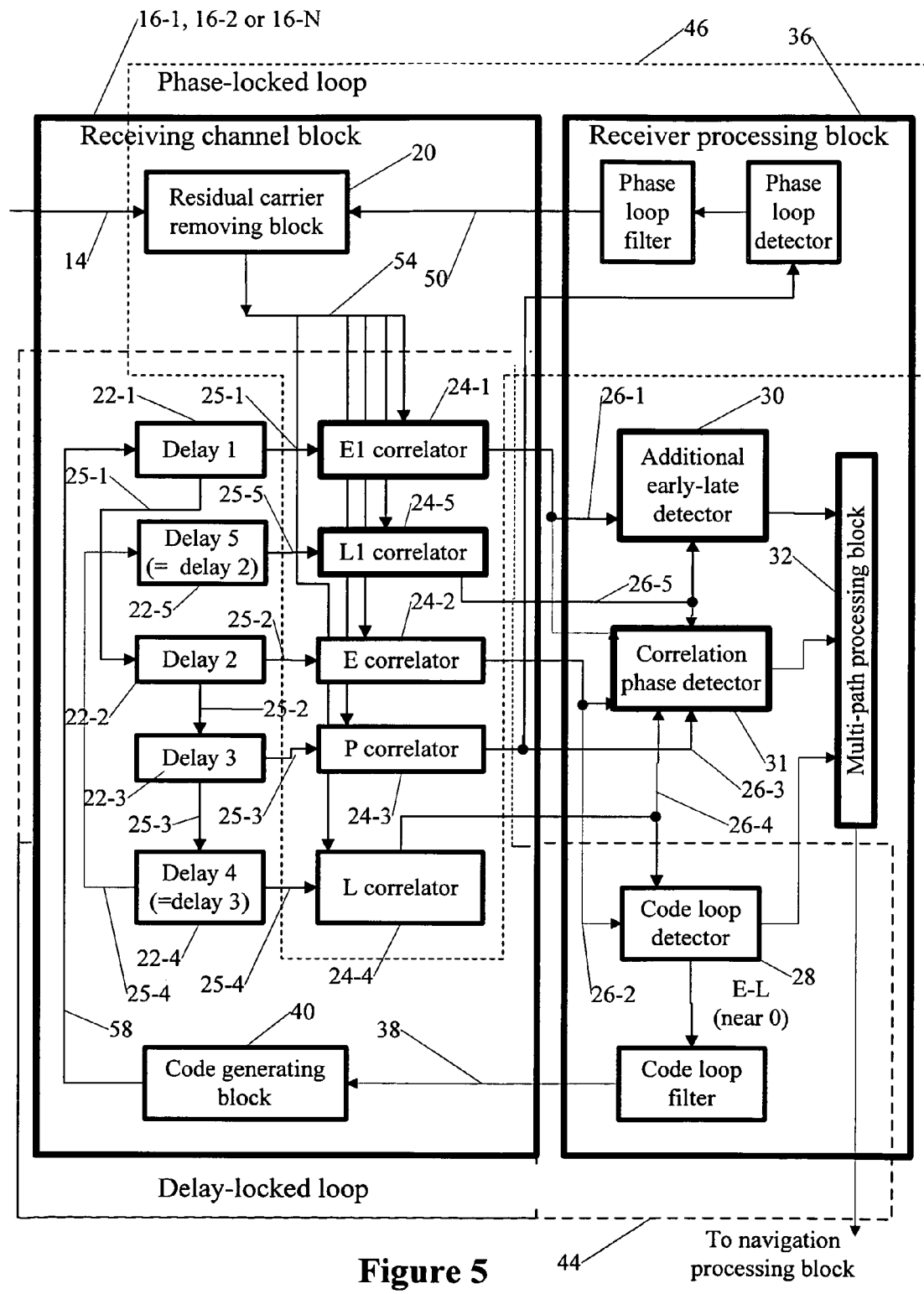
FIG. 5 is a block diagram representing an example of a single receiving channel and a receiving processing block within a global navigation satellite system receiver (spread spectrum receiver), according to the present invention.

FIG. 5 is a block diagram representing one example, among others, for implementing the receiving channel block 16-1, 16-2, . . . , or 16-N of a receiving module 16 and the receiving processing block 36, both contained in the spread spectrum receiver 10, according to the present invention. FIG. 5 shows components of the module 16 and the block 36 relevant to the present invention.

The receiving channel block 16-1, 16-2, . . . , or 16-N comprises a residual carrier removing block 20 used for generating a data intermediate signal 54 by removing a residual carrier frequency from the digital IF signal 14 using a feedback of a phase-loop (or phase-locked loop) 46, i.e., in response to a frequency control signal 50 indicative of said phase-loop feedback from said receiver processing block 36. The receiving channel block 16-1, 16-2, . . . , or 16-N also comprises a code generating block 40 used for generating a code signal 58 indicative of a delay-loop (or delay-locked loop) 44 feedback, i.e., in response to a code control signal 38 indicative of said delay-loop feedback from the receiver processing block 36 as a part of a delay-locked loop 44.

The data intermediate signal 54 is provided to each of five correlators (E1 E, P, L, L1) 24-1, 24-2, . . . , 24-5. The correlators 24-1 and 24-2 correspond to the early correlators E1 and E, respectively, described above; the correlators 24-4 and 24-5 correspond to late correlators L and L1, respectively, described above; and the correlator 24-3 correspond to the prompt correlator described above. The code signal 58 is provided to a first delay module 22-1 and then each of five consecutively delayed code signals 25-1, 25-2, . . . , 25-5 generated by a corresponding one of five delay modules 22-1, 22-2, . . . , 22-5 is provided to one corresponding correlator module of said five correlator modules 24-1, 24-2, . . . , 25-4, as shown in FIG. 5, wherein said each of said five delayed code signals 25-1, 25-2, . . . , 25-5 is consecutively and individually delayed by pre-selected values relative to a previously delayed code signal of said five consecutively delayed code signals 25-1, 25-2, . . . , 25-5 starting with the code signal 58 provided by the code generating block 40 to the delay module 22-1. The pre-selected delay values are chosen based on the algorithm shown in FIGS. 4a and 4b, such that the delay signal 25-1 corresponds to the E1 point, the delay signal 25-2 corresponds to the E point, the delay signal 25-3 corresponds to the P point, the delay signal 25-4 corresponds to the L point, and the delay signal 25-5 corresponds to the L1 point.

Each of the five correlator modules 24-1, 24-2, . . . , 24-5 generates a corresponding one of five correlation signals 26-1, 26-2, . . . , 26-5 and these correlation signals 26-1, 26-2, . . . , 26-5 are provided to the receiver processing block 36 for determining whether the distortion of the received radio frequency signal caused by said multi-path component meets a predetermined condition. Each of the five correlation signals 26-1, 26-2, . . . , 26-5 can contain an amplitude parameter or a phase parameter or both said amplitude parameter and said phase parameter, such that the correlation triangle shown in FIGS. 4a and 4b can be generated for the amplitude parameter and a plot of the phase parameter (or a phase parameter plot) as a function of different correlators (said plot is not a straight horizontal line if the multi-path is present because the phase parameter is different for different correlators) can be generated simultaneously, according to the present invention.

The correlation signals 26-2 and 26-4 (E and L points in FIGS. 4 and 4b), provided to a code loop detector 28 of the receiver processing block 36, corresponds to the traditional way of evaluating multi-path effects (e.g., maintaining the difference in the amplitude parameter of the correlation signals 26-2 and 26-4 close to zero through the delay-locked loop 44 using the code control signal 38 as shown in FIG. 5).

However, according to the present invention, if the multi-path detection is based on the phase information only, so that only the phase parameter plot is generated for the phase parameter, the correlation signals 26-2, 26-3 and 26-4 (i.e., the phase difference between them) provided to a correlation phase detector 31, can be optionally used without a further need for the correlation signals 26-1 and 26-5 for the determining whether the distortion of the received radio frequency signal caused by said multi-path component meets a predetermined condition (as described above). Indeed, even if the phase of the (prompt) correlator signal 26-3 is kept close to zero using said feedback signal 50 generated by the phase-locked loop 46 as shown in FIG. 5, said determining can be implemented by providing said correlation signals 26-1, 26-2, . . . , 26-5 (or just 26-2, 26-3 and 26-4) to a correlation phase detector 31 which generates and provides phase parameters of the corresponding correlation signals 26-1, 26-2, . . . , 26-5 (or 26-2, 26-3 and 26-4) to a multi-path processing block 32 of said block 36 for performing said determining. The block 32 can use a phase difference of signals 26-1, 26-2, . . . , 26-5 (or 26-2, 26-3 and 26-4) but also, optionally, can include the phase of the signals 26-1, 26-3 and 26-5 in said determining. On the other hand, if the multi-path detection is based on evaluating the amplitude parameter or for both the amplitude and phase parameters, according to the present invention, the correlation signals 26-1 and 26-5 are provided to an additional early-late detector 30 (in an alternative scenario, the block 30 can be combined with the block 28 and/or with the block 31) of the receiver processing block 36, as shown in FIG. 5. The additional early-late detector 30 can generate the amplitude parameters of the correlation signals 26-1 and 26-5 or directly the difference (the additional early-minus-late error) signal between the correlation signals 26-1 and 26-5 and provides these amplitude parameters or said difference to the multi-path processing block 32, while maintaining the difference in the amplitude parameter of the correlation signals 26-2 and 26-4 close to zero through the delay-locked loop 44 using the signal 38 as described above.

The multi-path processing block 32 determines, based on the inputs from the blocks 28, 31 and/or 30, whether the distortion of the received radio frequency signal caused by said multi-path component meets said predetermined condition. If the predetermined condition is not met, then the presence of the not acceptable multi-path component can be declared, such that, according to the present invention, the received radio code modulated signal (e.g., from a particular satellite) is deselected from further consideration and processing beyond the receiver processing block 36, i.e., no further signal is provided to the navigation processing block 19. Alternatively, an intermediate measure can be assigning a smaller weight to information contained in said multi-path "contaminated" code modulated signal than to a "clean" multi-path-free signal, but still providing this "contaminated" code modulated signal to the navigation processing block 19 as explained above. If, however, the multi-path processing block 32 determines that the distortion of the received radio frequency signal caused by said multi-path component meets said predetermined condition, it provides said code modulated signal to the navigation processing block 19 for further processing.

Figure 6:
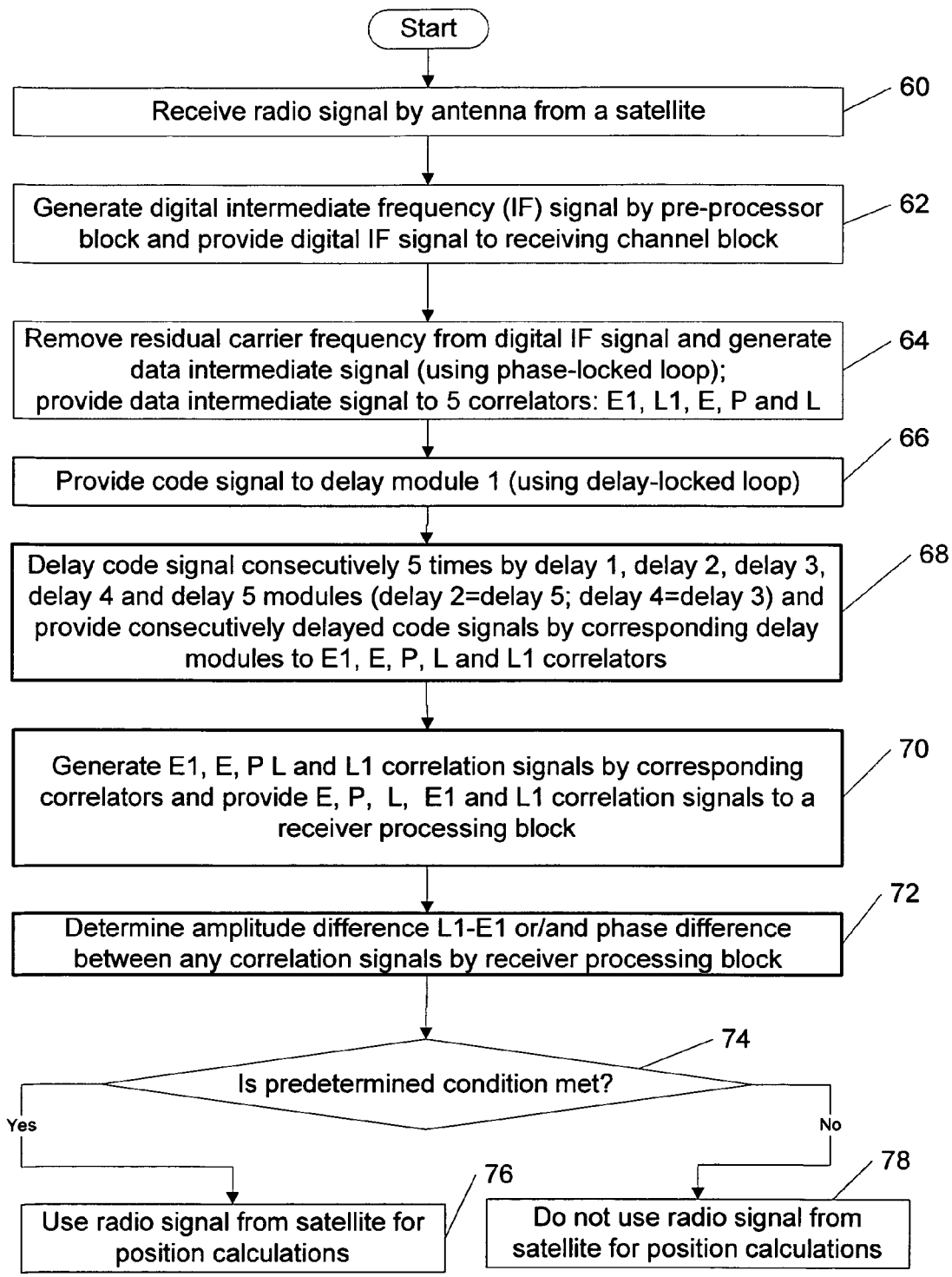
FIG. 6 is a flow chart representing an example of a multi-path selective detection operation of a global navigation satellite system receiver (spread spectrum receiver), according to the present invention.

FIG. 6 is a flow chart representing an example of a multi-path selective detection operation of the global navigation satellite system receiver (spread spectrum receiver) 10, according to the present invention.

The flow chart of FIG. 6 only represents one possible scenario among others. In a method according to the present invention, in a first step 60, the radio frequency signal containing said multi-path component is received and converted to the radio frequency electrical signal 11a by an antenna 11. In a next step 62, said radio frequency electrical signal 11a is converted to a digital intermediate frequency (IF) signal (or a digital signal) 14 by a preprocessor 12 and said digital signal 14 is provided to each of N receiving channel blocks 16-1, 16-2, . . . , 16-N.

In a next step 64, the residual carrier frequency is removed from the digital IF signal and the data intermediate signal is generated (using the carrier phase-locked loop) and provided to each of five correlators (E1 E, P, L, L1) 24-1, 24-2, . . . , 24-5.

In a next step 66, the code signal 58 indicative of a delay-loop (or delay-locked loop) 44 feedback is generated and provided to the delay module 22-1.

In a next step 68, each of five consecutively delayed code signals 25-1, 25-2, . . . , 25-5 generated by a corresponding one of five delay modules 22-1, 22-2, . . . , 22-5 is provided to one corresponding correlator module of said five correlator modules 24-1, 24-2, . . . , 25-4, wherein said each of said five delayed code signals 25-1, 25-2, . . . 25-5 is consecutively and individually delayed by pre-selected values relative to a previously delayed code signal of said five consecutively delayed code signals 25-1, 25-2, . . . , 25-5 starting with the code signal 58. The pre-selected delay values are chosen based on the algorithm shown in FIGS. 4a and 4b, such that the delay signal 25-1 corresponds to the E1 point, the delay signal 25-2 corresponds to the E point, the delay signal 25-3 corresponds to the P point, the delay signal 25-4 corresponds to the L point, and the delay signal 25-1 corresponds to the L1 point.

In a next step 70, Each of the five correlator modules 24-1, 24-2, . . . , 24-5 generates a corresponding one of five correlation signals 26-1, 26-2, . . . , 26-5 (E1 E, P, L, L1) and these correlation signals 26-1, 26-2, . . . , 26-5 (both amplitude and phase) are provided to the receiver processing block 36 for determining whether the distortion of the received radio frequency signal caused by said multi-path component meets a predetermined condition. In a next step 72, the receiver processing block 36 generates the difference (the additional early-minus-late error) signal between the correlation signals 26-1 and 26-5 (E1 and L1), and/or the phase difference between any correlation signals.

In a next step 74, it is determined by the receiver processing block 36 whether the predetermined condition is met (for the amplitude or/and for the phase) based on the results of step 72. If that is not the case, the evaluated radio signal from the particular satellite is not used (shown as step 76) for position calculations (e.g., the signal is not passed to the navigation processing block 19). If, however, it is determined that the predetermined condition is met, in a next step the evaluated radio signal from the particular satellite is used for position calculations (e.g., the signal is passed to the navigation processing block 19).

Figure 7:
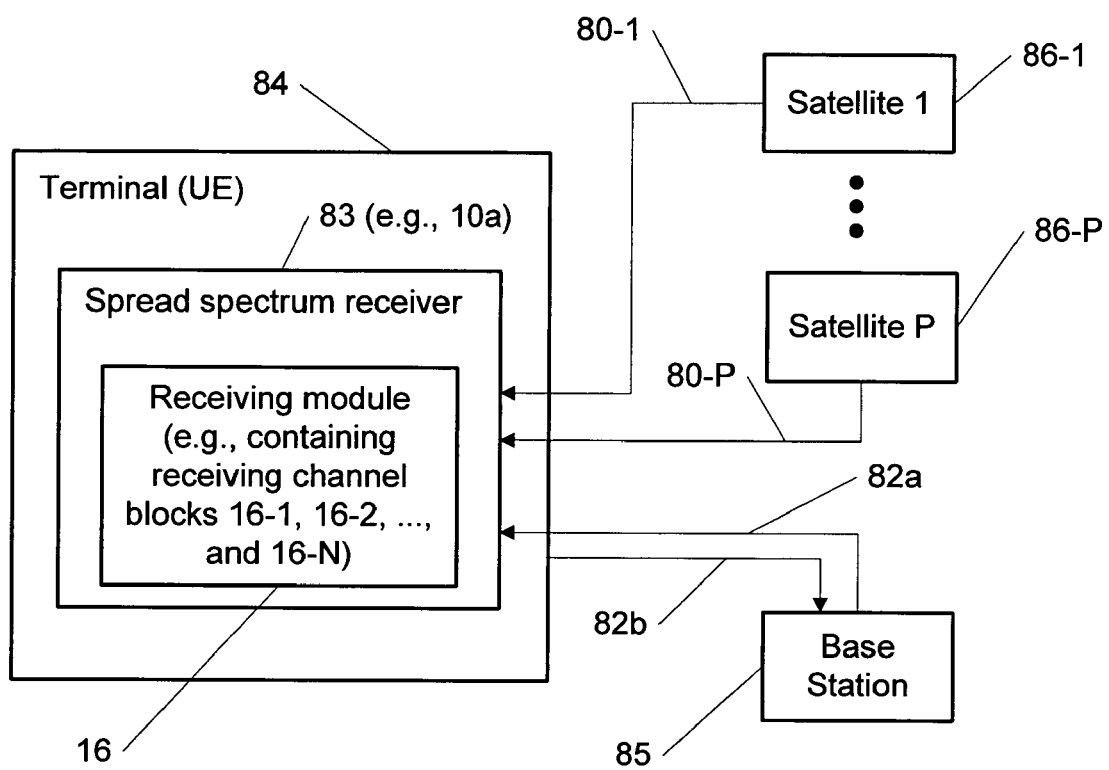
FIG. 7 is a diagram showing an example of a terminal with a spread spectrum receiver capable of a multi-path selective detection operation for processing radio frequency signals from satellites and/or base stations.

The present invention can be applied to a variety of applications and not only to the GPS and Galileo satellite navigation systems. The invention can be used equally well with other navigation systems or more generally with any communication systems utilizing a spread spectrum receiver. An example of such a system is shown in FIG. 7. A terminal (or a user equipment, UE) 84 is a communication device, such as a mobile device or a mobile phone, containing a CDMA receiver 83 according to the present invention. The CDMA receiver 83 can be, for instance, the spread spectrum (GNSS) receiver 10 described in the examples of FIGS. 2 and 5. Moreover, said CDMA receiver 83 contains a receiving module 16 with the key innovation as described above. The block 16 can be built as a removable unit. The receiving module 16 can be, for example, a combination of receiving channel blocks 16-1, 16-2, . . . , and 16-N as presented in FIG. 2. FIG. 7 shows P satellites 86-1, . . . , 86-P sending P satellite signals 80-1, . . . , 80-P, to the CDMA spread spectrum receiver 83. FIG. 7 also shows a base station 85, which communicates with the terminal 84 by sending, e.g., a mobile CDMA communication signal 82a to the CDMA spread spectrum receiver 83 and receiving back the outgoing communication signal 82b from the terminal 84. The signals 80-1, . . . , 80-P and 82a can contain the multi-path components and are processed by the receiving module 16 as described in the present invention.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A spread spectrum receiver, comprising:
   a receiving block, configured to perform a correlation analysis of a digital signal generated from a radio frequency signal comprising a multi-path component using at least two pairs of correlation signals, each pair being symmetrical relative to a prompt point, by maintaining equal the correlation signals of one pair of said two pairs and evaluating a difference between the correlation signals of another pair of said two pairs; and
   a receiver processing block, configured to detect said multi-path component and determining whether a distortion of said radio frequency signal caused by said multi-path component meets a predetermined condition using said correlation analysis of said digital signal, and for making a decision whether to further process the received radio frequency signal using results of said multi-path detection analysis for implementing a multi-path detection analysis of said radio frequency signal by said spread spectrum receiver.

2. The spread spectrum receiver of claim 1, wherein said spread spectrum receiver is configured to further process said radio frequency signal beyond said receiver processing block after making said decision, only if said distortion meets said predetermined condition, for implementing a selective function of said multi-path detection operation of the spread spectrum receiver.

3. The spread spectrum receiver of claim 1, wherein said radio frequency signal is a code division multiple access signal.

4. The spread spectrum receiver of claim 1, wherein said receiving block comprises N receiving channel blocks, N being an integer of at least a value of one, and each of said N receiving channel blocks, comprises:
   residual carrier removing block, configured to generate a data intermediate signal by removing a residual carrier frequency from said digital signal using a phase-loop feedback;
   code generating block, configured to generate a code signal indicative of a delay-loop feedback;
   K correlator modules, wherein K is an odd integer of at least a value of five, configured to generate each of K correlation signals by a corresponding one of said K correlator modules using said data intermediate signal and K delayed code signals and for providing said K correlation signals to said receiver processing block for said determining whether a distortion of said radio frequency signal caused by said multi-path component meets a predetermined condition using a correlation analysis of said digital signal, wherein said each of said K correlation signals contains an amplitude parameter or a phase parameter or both said amplitude parameter and said phase parameter; and
   K delay modules, configured to provide each of K consecutively delayed code signals to one corresponding correlator module of said K correlator modules, wherein said each of said K delayed code signals is consecutively and individually delayed by pre-selected values relative to a previously delayed code signal of said K consecutively delayed code signals starting with said code signal provided to a first delay module out of said K delay modules by said receiver processing block.

5. The spread spectrum receiver of claim 4, wherein the receiver processing block is configured to evaluate said distortion of said radio frequency signal caused by said multi-path component using said predetermined condition by comparing said amplitude parameter of an Mth correlation signal of said K correlation signals generated using an Mth delayed code signal of said K consecutively delayed code signals, wherein M=1, or 2 . . . or (K−1)/2, and said amplitude parameter of a corresponding Lth correlation signal of said K consecutively delayed code signals generated using a corresponding Lth delayed code signal of said K correlation signals, wherein L=K, or K−1 . . . or (K+3)/2.

6. The spread spectrum receiver of claim 4, wherein the spread spectrum receiver is configured to maintain equal, using a delay-locked loop, said amplitude parameter of two correlation signals of said K correlation signals, generated by corresponding correlator modules using corresponding delayed code signals of said K consecutively delayed code signals delayed by (K−1)/2 and (K+3)/2 times respectively.

7. The spread spectrum receiver of claim 4, wherein the receiver processing block is configured to evaluate said distortion of said radio frequency signal caused by said multi-path component by comparing the amplitude parameter of a first of said K correlation signals generated using a first delayed code signal of said K consecutively delayed code signals and a last of said K correlation signals generated using a last delayed code signal of said K consecutively delayed code signals.

8. The spread spectrum receiver of claim 4, wherein K=5.

9. The spread spectrum receiver of claim 4, wherein the spread spectrum receiver is configured to maintain to be zero, using a delay-locked loop, said phase parameter of one correlation signal of said K correlation signals, generated by a corresponding correlator module of said K correlator modules using a corresponding delayed code signal of said K consecutively delayed code signals delayed by (K+1)/2 times and wherein phase parameters of said K correlation signals are provided to said receiver processing block for said determining.

10. The spread spectrum receiver of claim 4, wherein each said receiving channel block comprises a code generating block, configured to generate said code signal in response to a code control signal indicative of said delay-loop feedback from said receiver processing block as a part of a delay-locked loop.

11. The spread spectrum receiver of claim 4, wherein each said receiving channel block comprises a residual carrier removing block configured to generate said data intermediate signal in response to a frequency control signal indicative of said phase-loop feedback from said receiver processing block.

12. The spread spectrum receiver of claim 1, wherein said spread spectrum receiver is a global navigation satellite system receiver, a global positioning system receiver or a Galileo receiver.

13. The spread spectrum receiver of claim 1, further comprising;
an antenna, responsive to the radio frequency signal containing said multi-path component, configured to provide a radio frequency electrical signal; and
a preprocessor, responsive to the radio frequency electrical signal, configured to provide the digital signal.

* * * * *